US010322456B1

(12) United States Patent
Winslow et al.

(10) Patent No.: US 10,322,456 B1
(45) Date of Patent: Jun. 18, 2019

(54) FLANGE REMOVAL TOOL ASSEMBLY

(71) Applicant: Kidde Technologies, Inc., Wilson, NC (US)

(72) Inventors: Edwin Ray Winslow, Clayton, NC (US); Sammy H. Creech, Kenly, NC (US); Paul Gustav Kirchheimer, Clayton, NC (US)

(73) Assignee: Kidde Technologies, Inc., Wilson, NC (US)

( * ) Notice: Subject to any disclaimer, the term of this patent is extended or adjusted under 35 U.S.C. 154(b) by 0 days.

(21) Appl. No.: 15/891,026

(22) Filed: Feb. 7, 2018

(51) Int. Cl.
*B23B 41/00* (2006.01)
*B23C 3/12* (2006.01)

(52) U.S. Cl.
CPC ............. *B23C 3/12* (2013.01); *B23B 41/00* (2013.01); *Y10T 408/173* (2015.01); *Y10T 408/18* (2015.01); *Y10T 408/5634* (2015.01); *Y10T 408/6786* (2015.01)

(58) Field of Classification Search
CPC .......... B23B 41/00; B23P 11/00; B23P 19/00; Y10T 408/173; Y10T 408/18; Y10T 408/20; Y10T 408/5633; Y10T 408/56337; Y10T 408/5634; Y10T 408/56343; Y10T 408/6786; Y10T 137/6109; Y10T 137/6113
USPC ............................ 29/235, 238–239, 255, 278
See application file for complete search history.

(56) References Cited

U.S. PATENT DOCUMENTS

| | | | | |
|---|---|---|---|---|
| 1,941,551 A | * | 1/1934 | Gjertsen | B23C 5/242 408/112 |
| 2,345,401 A | * | 3/1944 | Lindegren | B25B 1/18 269/240 |
| 2,413,677 A | * | 1/1947 | Beitz | B23B 47/28 408/16 |
| 2,576,485 A | * | 11/1951 | Schwandt | B27F 5/10 144/84 |
| 2,973,674 A | * | 3/1961 | Hladik | B23Q 3/062 269/156 |
| 3,724,963 A | * | 4/1973 | Stadtmiller | B23Q 16/001 33/642 |
| 3,731,381 A | | 5/1973 | Penfield et al. | |
| 3,805,394 A | * | 4/1974 | Marberg | B23B 49/00 33/509 |
| 3,843,276 A | * | 10/1974 | Williams | B23B 39/14 408/236 |
| 4,498,339 A | | 2/1985 | Diggins | |

* cited by examiner

*Primary Examiner* — Sunil K Singh
*Assistant Examiner* — Chwen-Wei Su
(74) *Attorney, Agent, or Firm* — Kinney & Lange, P.A.

(57) ABSTRACT

A flange removal tool assembly includes a cutting tool actuator, vise, annular cutting tool, and center support and accurately removes a weld and a flange of a device, while the device is attached to a fitting in a pressure vessel. Once the weld and the flange are removed, the device can be removed from the fitting and replaced. The assembly allows the operator to quickly inspect the flange of the device during the removal process and reduces the probability of damaging a flange of the fitting.

20 Claims, 7 Drawing Sheets

FLANGE REMOVAL TOOL ASSEMBLY

BACKGROUND

This disclosure relates generally to a flange removal tool. More specifically, this disclosure relates to a flange removal tool for a weld and a flange of a device installed on a pressure vessel.

Many pressure vessels require the use of pressure switches, ports, and other devices to fill, monitor, and functionally use the pressure vessel. These devices need to be easily removed for replacement when they malfunction, are damaged, or during refurbishment of the pressure vessel. The fittings that hold these devices are welded into the pressure vessel. The fittings have internal threads that are used to receive the mating threads on the devices to be installed. The threaded connection does not create an airtight seal; therefore, a sealing flange is used on both the fitting and the device. After the two sealing flanges are in contact, a weld is used to seal the edges of the flanges together to form an airtight seal.

When the situation arises in which the device must be removed from the pressure vessel, the weld around the two sealing flanges is removed and the device is unthreaded from the fitting. Use of a grinder or specialized hand tool can result in too much material being removed from the flange on the fitting. If too much material is removed, the flange on the fitting could become too small to be utilized again. Using the specialized hand tool is time consuming because the operator must adjust the depth of the cutting/grinding edges, install on the flange, rotate a few times to perform grinding, and then remove the specialized hand tool to visually determine how much material was removed. The technician repeats the process until the correct amount of material has been removed. As such, there is a need for a flange removal tool that consistently removes a weld and a flange of a device installed on a pressure vessel in a time-efficient manner.

SUMMARY

According to one aspect of the invention, a flange removal tool assembly includes a cutting tool actuator, an annular cutting tool, a vise, and a fixture. The cutting tool actuator includes a housing, a motor, a lever, and a spindle. The housing is configured to protect the internal components of the cutting tool actuator; the motor is configured to provide mechanical power to the cutting tool actuator; and the lever is configured to control the vertical displacement of the spindle. The lever is disposed on the housing and interfaces with the spindle that extends from the housing. The annular cutting tool is secured to the spindle and rotates with the spindle. The vise is disposed below the cutting tool actuator and the vise is configured to grip a neck of a fitting located on a pressure vessel. The fixture is disposed below the vise, and the fixture includes a center support that is axially aligned with an axis of rotation of the spindle. The center support is configured to support the pressure vessel. The flange removal tool assembly uses the annular cutting tool to remove a flange of a device installed in the fitting located on the pressure vessel while preserving a flange of the fitting.

According to another aspect of the invention, a method of removing a weld and a flange of a device, with the device secured to a fitting on a pressure vessel includes securing a pressure vessel to a flange removal tool assembly; lowering the non-rotating annular cutting tool with the lever onto the top surface of the flange of the device connected to the fitting on the pressure vessel; recording the top surface of the flange of the device using the cutting tool actuator controls; activating the cutting tool actuator to rotate the annular cutting tool attached to the spindle; lowering the annular cutting tool with the lever an amount that corresponds to a thickness of the flange of the device; and removing a weld and the flange of the device without removing a flange of the fitting, allowing the device to be removed from the fitting. The flange removal tool assembly including a cutting tool actuator with a housing, a motor, a lever, and a spindle, an annular cutting tool attached to the spindle, a vise, and a fixture that includes a center support.

DETAILED DESCRIPTION

Figure 1A:
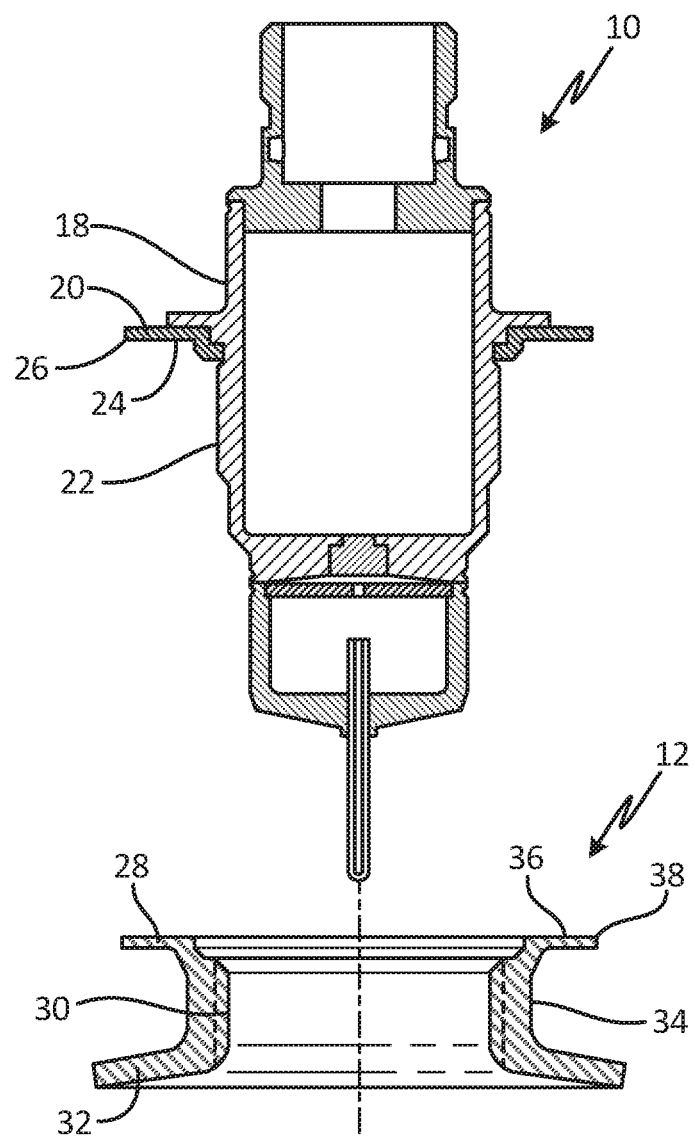
FIG. 1A is an exploded cross-sectional view of a fitting and a device for a pressure vessel.
Figure 1B:
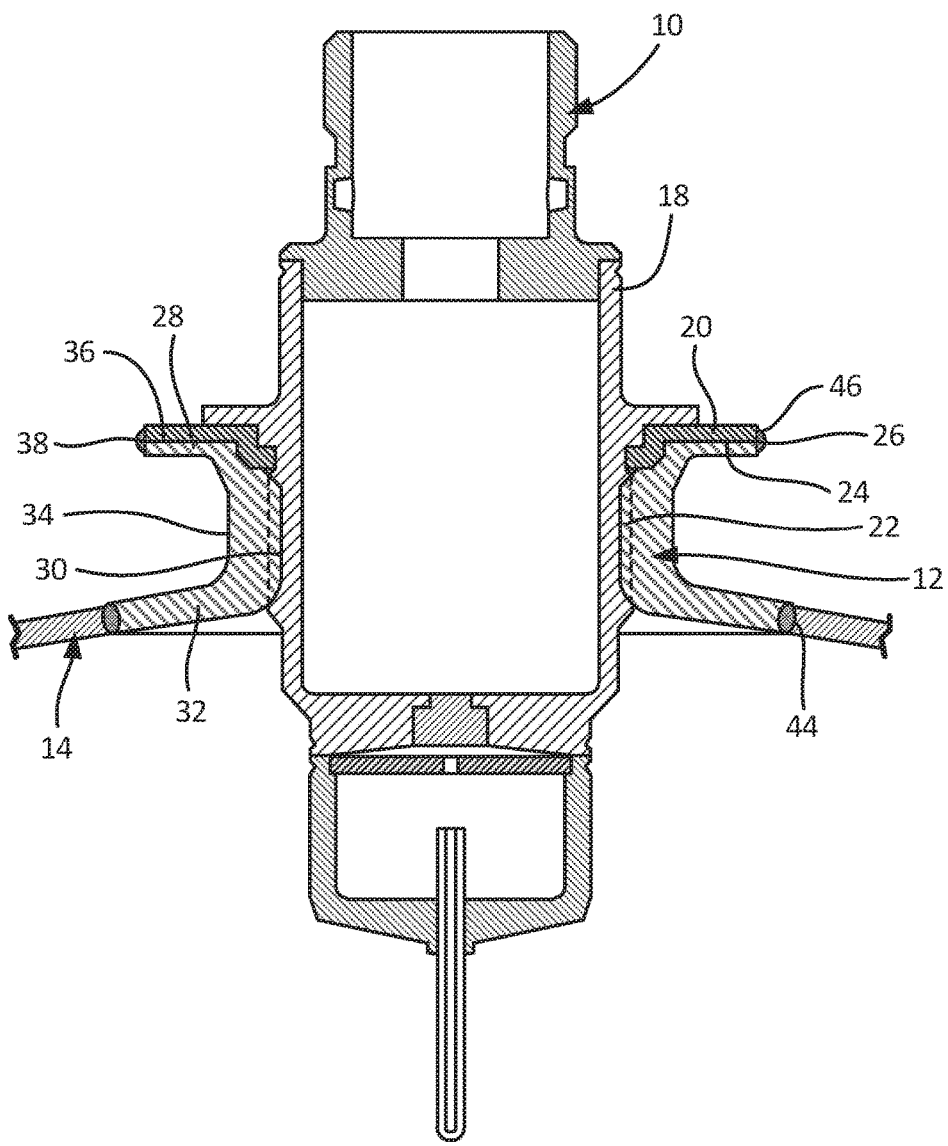
FIG. 1B is a cross-sectional view of a fitting and a device installed in a pressure vessel.
Figure 1C:
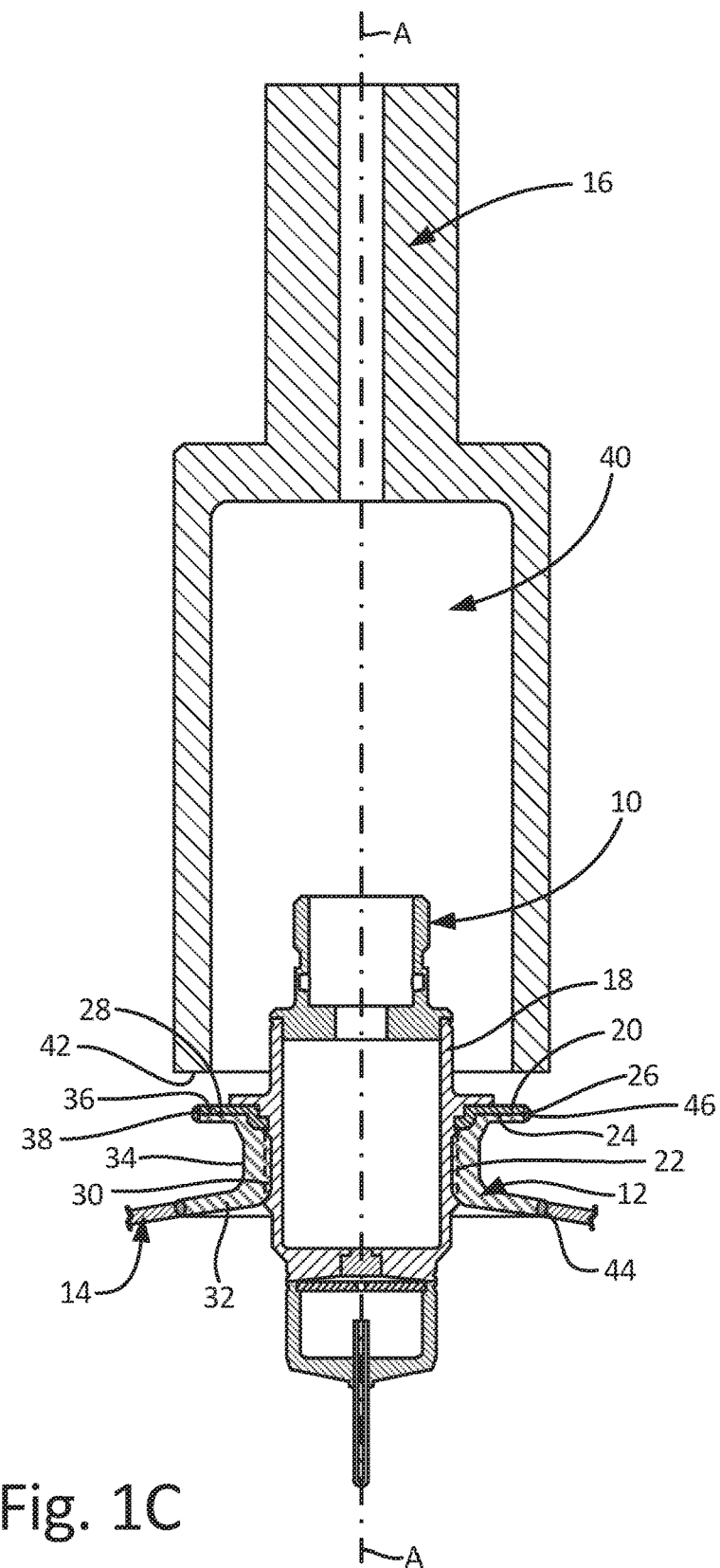
FIG. 1C is a cross-sectional view of a cutting tool positioned over a device and a fitting.

FIG. 1A is an exploded cross-sectional view of device 10 and fitting 12. FIG. 1B is a cross-sectional view of device 10 and fitting 12 installed in pressure vessel 14. FIG. 1C is a cross-sectional view of annular cutting tool 16 positioned over device 10 and fitting 12. FIGS. 1A-1C will be discussed together. Device 10 includes body 18, flange 20, and external threads 22. Flange 20 includes sealing surface 24 and edge 26. Fitting 12 includes flange 28, internal threads 30, base 32, and neck 34. Flange 28 includes sealing surface 36 and edge 38. Annular cutting tool 16 includes hollow section 40 and cutting tip 42. FIGS. 1B-1C also show first weld 44 and second weld 46.

Flange 20 is circular in shape and surrounds the body 18 of device 10. Sealing surface 24 is disposed on the bottom side of flange 20 and is configured to provide a flat mating surface for sealing surface 36 of fitting 12. Edge 26 is positioned at the intersection of the side surface of flange 20 and the circumferentially outermost point of sealing surface 24. External threads 22 are situated on body 18 below flange 20, sealing surface 24, and edge 26. External threads 22 are configured to be threaded into internal threads 30, securing device 10 in fitting 12. Device 10 can be a port, sensor, pressure switch, or any other device that is required to fill, monitor, or functionally use pressure vessel 14. Pressure vessel 14 can be any vessel that is suitable for storing a fluid at an elevated pressure compared to ambient pressure. Pressure vessel 14 can be of any suitable shape or size and is not limited to the specific embodiment presented in the following discussion.

Flange 28 constitutes the top portion of fitting 12 and includes sealing surface 36 on the top surface of flange 28. Sealing surface 36 is configured to provide a flat mating surface for flange 20 of device 10. Edge 38 is positioned at the intersection of the side surface of flange 28 and the circumferentially outermost point of sealing surface 36. Internal threads 30 are located in the center portion of fitting 12 and are configured to receive external threads 22 of device 10. Base 32 is positioned opposite flange 28 and constitutes the bottom portion of fitting 12. Base 32 is configured to be welded into pressure vessel 14. Neck 34 is disposed between flange 28 and base 32 and constitutes the smaller-diameter portion of fitting 12.

Hollow section 40 is disposed in the center portion of annular cutting tool 16. Hollow section 40 is configured to receive body 18 of device 10, allowing cutting tip 42 to reach flange 20 of device 10. Cutting tip 42 is disposed at the bottom edge of annular cutting tool 16 and is configured to remove material in a level and consistent manner across cutting tip 42. A level and consistent cut ensures that a precise amount of material is removed from flange 20 of device 10 and not from flange 28 of fitting 12. Cutting tip 42 is preferably at an angle of 90 degrees measured from axis A-A to achieve a level and consistent cut.

As shown in FIGS. 1B-1C, fitting 12 is positioned within an aperture in pressure vessel 14 and securely held in place with first weld 44. First weld 44 is disposed at the location where base 32 and pressure vessel 14 are in contact. First weld 44 circumferentially surrounds and attaches fitting 12 to pressure vessel 14, creating an airtight seal between fitting 12 and pressure vessel 14. Fitting 12 includes internal threads 30, which are configured to receive external threads 22 of device 10. Device 10 is installed onto pressure vessel 14 by threading device 10 into fitting 12. Once device 10 has been fully threaded into fitting 12, flange 20 of device 10 and flange 28 of fitting 12 are in contact. Further, sealing surface 24 of device 10 and sealing surface 36 of fitting 12 are in contact. Second weld 46 circumferentially surrounds the location where edge 26 of device 10 and edge 38 of fitting 12 are in contact, creating an airtight seal between device 10 and fitting 12.

After device 10 and fitting 12 are fully installed, device 10 may need to be removed from pressure vessel 14 for various reasons. For example, device 10 may need to be removed for replacement due to damage or if device 10 malfunctions. Further, device 10 may need to be removed when it is time to refurbish pressure vessel 14. To remove device 10 from fitting 12, flange 20 of device 10 and second weld 46 are removed and then device 10 can be unthreaded from fitting 12. A cutting or grinding process is used to remove flange 20 of device 10 and second weld 46 from fitting 12. When the cutting or grinding process is performed, it is important that only minimal amounts of material, if any, be removed from flange 28 of fitting 12. If too much material is removed from flange 28, flange 28 could become too small to be utilized again. For example, if the diameter of flange 20 of device 10 is larger than the diameter of flange 28 of fitting 12, edge 26 and edge 38 may not align correctly and second weld 46 will not create an airtight seal. Further, if too much material is removed from flange 28 of fitting 12, flange 28 can become too thin to receive second weld 46. Thus, only a minimal amount of material should be removed from flange 28 of fitting 12.

As shown in FIG. 1C, annular cutting tool 16 is used to perform the cutting or grinding process to remove flange 20 of device 10 and second weld 46. Annular cutting tool 16 is lowered toward device 10 and fitting 12. Hollow section 40 receives body 18 of device 10, allowing contact to occur between flange 20 and cutting tip 42 and between cutting tip 42 and second weld 46. Annular cutting tool 16 is rotated and the flat surface of cutting tip 42 grinds a consistent amount of material off of flange 20 of device 10. Annular cutting tool 16 grinds flange 20 to fully remove flange 20 and the portion of second weld 46 associated with flange 20, which connects device 10 to fitting 12. The angle of cutting tip 42 prevents annular cutting tool 16 from grinding flange 28 of fitting 12, thereby preserving flange 28. With flange 20 of device 10 removed, device 10 is no longer attached to fitting 12 and can be unthreaded. Annular cutting tool 16 can then be raised away from device 10 and fitting 12, allowing device 10 to be unthreaded from fitting 12. Annular cutting tool 16 provides significant advantages because it produces consistent and accurate grinding, resulting in flange 20 and second weld 46 being removed while minimizing or eliminating removal of material from flange 28 of fitting 12.

Figure 2A:
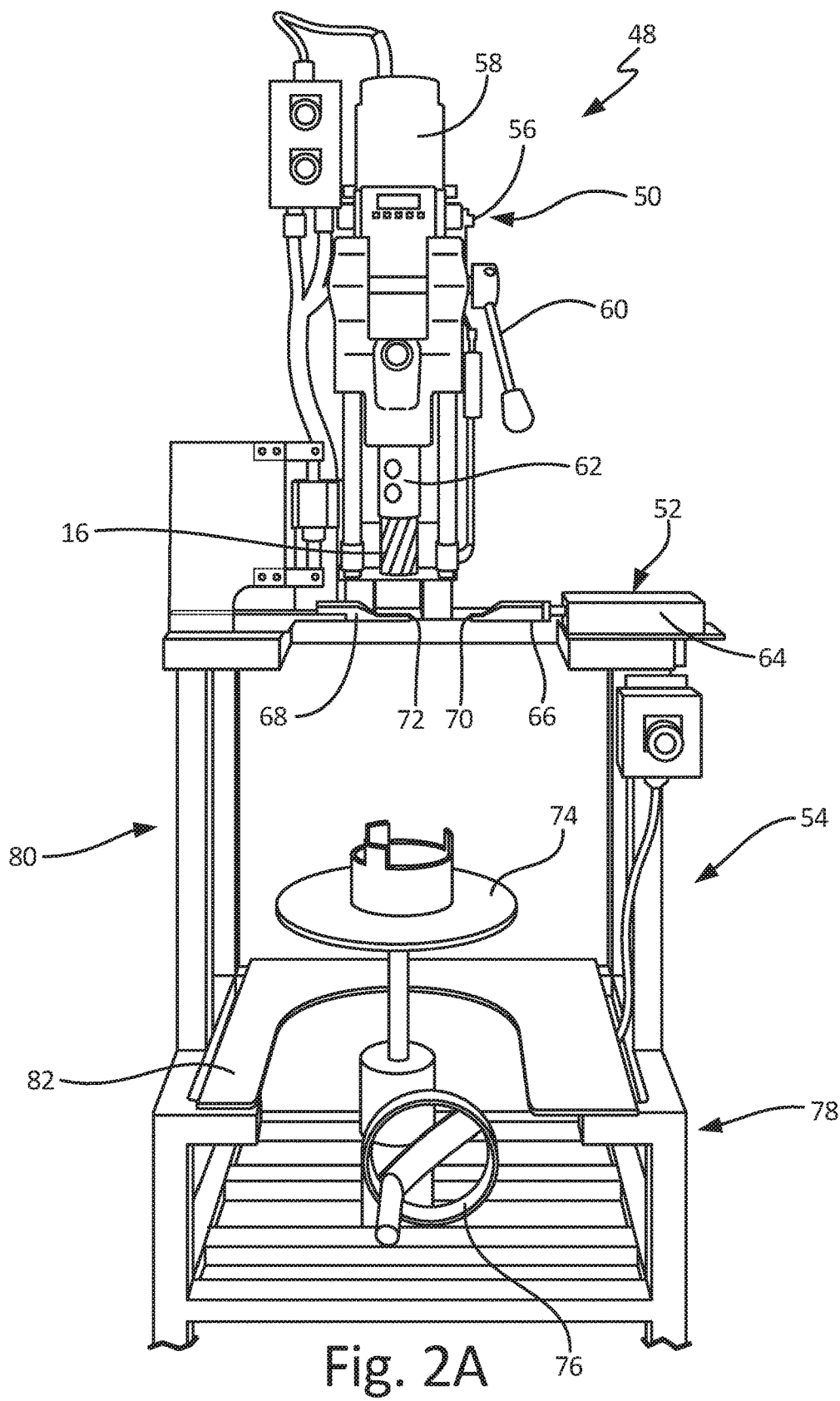
FIG. 2A is an isometric view of a flange removal tool assembly.
Figure 2B:
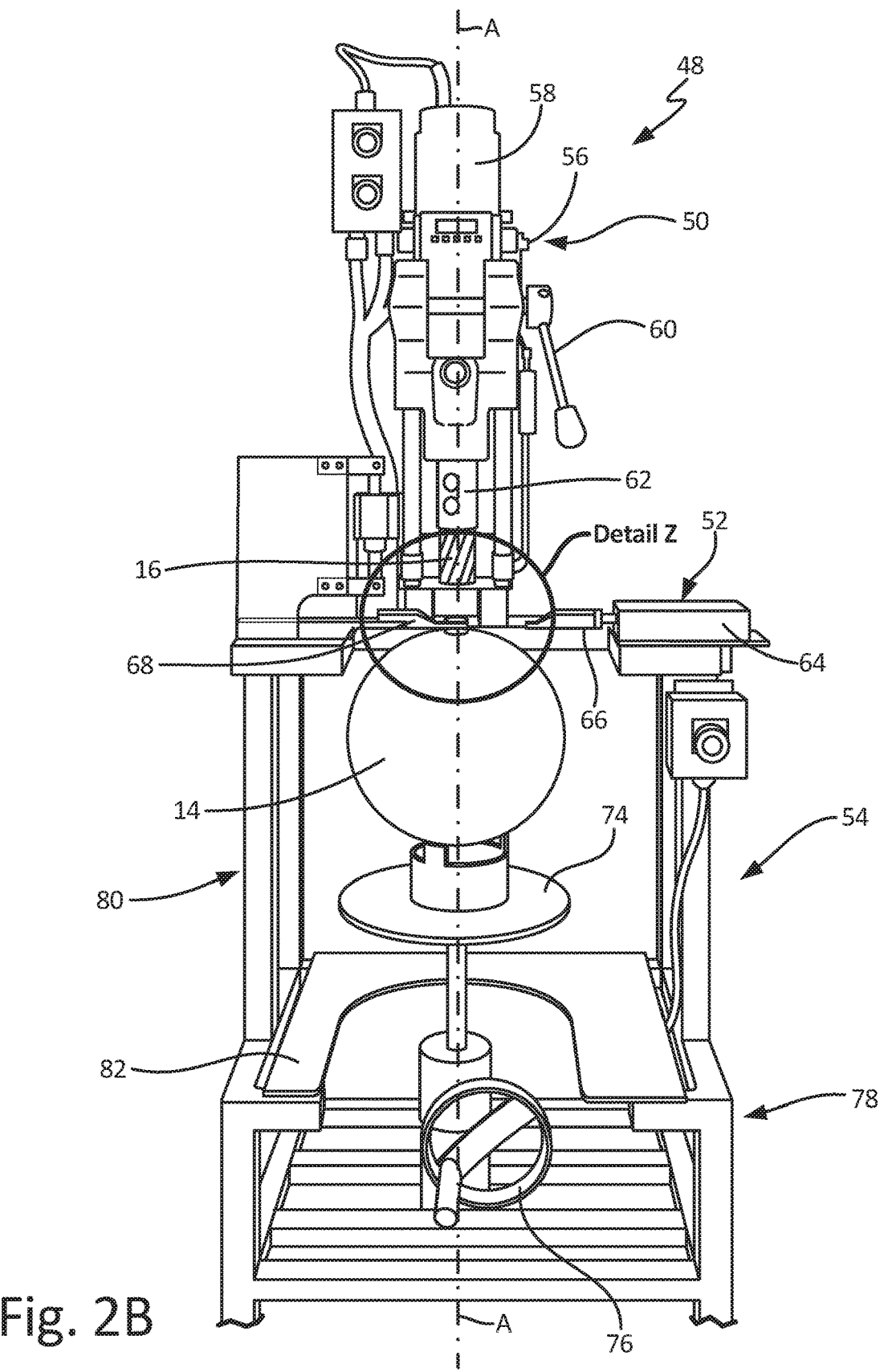
FIG. 2B is an isometric view of a flange removal tool assembly including a mounted pressure vessel.
Figure 2C:
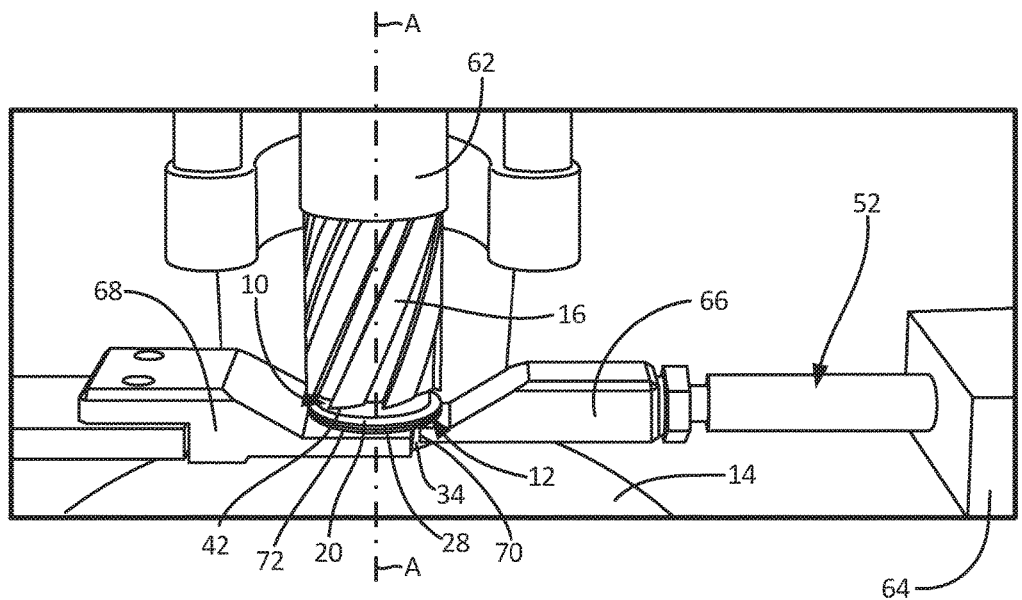
FIG. 2C is an enlarged view of Detail Z of FIG. 2B.
Figure 2D:
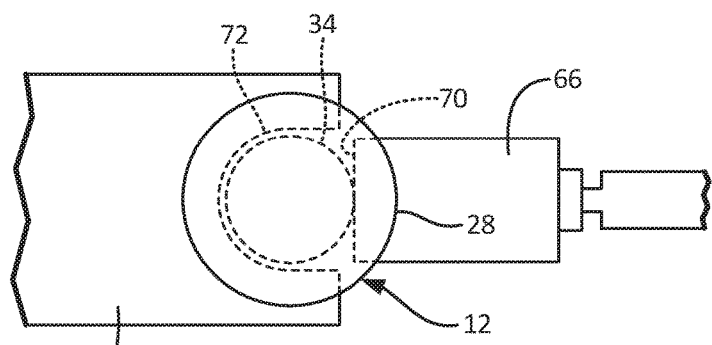
FIG. 2D is a top view of a stationary jaw and a moving jaw engaging a neck of a fitting.

FIG. 2A is an isometric view of flange removal tool assembly (FRTA) 48. FIG. 2B is an isometric view of FRTA 48 with pressure vessel 14 mounted on the assembly. FIG. 2C is an enlarged view of detail Z of FIG. 2B. FIG. 2D is a top view of vise 52 engaging neck 34 of fitting 12. FIGS. 2A-2D will be discussed together. FRTA 48 includes annular cutting tool 16, cutting tool actuator 50, vise 52, and fixture 54. Cutting tool actuator 50 includes housing 56, motor 58, lever 60, and spindle 62. Vise 52 includes main body 64, moving jaw 66, and stationary jaw 68. Moving jaw 66 includes flat tip 70 and stationary jaw 68 includes concave tip 72. Fixture 54 includes center support 74, crank 76, first set of support members 78, second set of support members 80, and flat tabletop surface 82.

Cutting tool actuator 50 is positioned atop FRTA 48 and is supported by fixture 54. Housing 56 covers the gearing and other components that allow cutting tool actuator 50 to operate. The base of housing 56 is mounted to fixture 54 with fasteners suitable to withstand normal forces experienced during operation, fixedly securing cutting tool actuator 50 in place. Motor 58 is positioned on top of and secured to housing 56. Motor 58 provides mechanical energy to cutting tool actuator 50, allowing cutting tool actuator 50 to function. Motor 58 is a low revolution per minute (RPM) motor configured to prevent heat buildup during the removal process. Located near the front and bottom portion of housing 56 is spindle 62. Spindle 62 is a rod that extends and is attached within housing 56. When cutting tool actuator 50 is operational, spindle 62 rotates about axis A-A at a speed designated by the controls on cutting tool actuator 50. Removably connected to spindle 62 is annular cutting tool 16. When annular cutting tool 16 is connected to spindle 62, annular cutting tool 16 rotates about axis A-A at the same rate as spindle 62. Attached to the side of housing 56 is lever 60. Lever 60 is also attached to spindle 62 within housing 56. Lever 60 pivots about an axis and controls the vertical height of spindle 62. For example, when lever 60 is rotated downward, spindle 62 will translate vertically downward along axis A-A at a proportional rate. Likewise, when lever 60 is rotated upward, spindle 62 will translate vertically upward along axis A-A at a proportional rate. Cutting tool actuator 50 provides rotating power to annular cutting tool 16 to facilitate removal of flange 20 of device 10 and second weld 46.

Vise 52 is positioned below cutting tool actuator 50 and is supported by fixture 54. Vise 52 is secured to fixture 54 using fasteners that are suitable to withstand normal forces experienced during operation. Vise 52 is used to firmly hold an object in place while work is being done on the object. In the embodiment shown, vise 52 includes main body 64, moving jaw 66, and stationary jaw 68. Main body 64 surrounds and protects the internal components of vise 52 from being damaged or filled with debris. Moving jaw 66 is coupled to the internal components within main body 64 and is configured to translate horizontally to apply pressure to an object that is placed between moving jaw 66 and stationary jaw 68, such as neck 34 of fitting 12. Moving jaw 66 includes flat tip 70 that is configured to press against neck 34 of fitting 12. Stationary jaw 68 is coupled to fixture 54 and includes concave tip 72 that is configured to extend around neck 34 of fitting 12. Further, concave tip 72 of stationary jaw 68 is configured to axially align fitting 12 on axis A-A, ensuring precise alignment during operation of FRTA 48. As shown, vise 52 is a pneumatic vise. It is understood, however, that vise 52 can be a hand-operated vise or a powered vise.

As shown in FIGS. 2B-2D, fitting 12 of pressure vessel 14 is inserted into concave tip 72 of stationary jaw 68. More specifically, neck 34 of fitting 12 interfaces with concave tip 72 of stationary jaw 68, aligning fitting 12 on axis A-A. Moving jaw 66 is then translated horizontally toward stationary jaw 68. Flat tip 70 of moving jaw 66 applies pressure to neck 34 of fitting 12, opposite stationary jaw 68. Moving jaw 66 and stationary jaw 68 hold fitting 12 securely while FRTA 48 is operational and work is being done on pressure vessel 14.

Fixture 54 is positioned at the base of FRTA 48 and provides support for all the other components of FRTA 48. Fixture 54 includes center support 74, crank 76, first set of support members 78, second set of support members 80, and flat tabletop surface 82. Center support 74 is positioned proximate the center of flat tabletop surface 82 and is axially aligned with axis A-A. Center support 74 is configured to provide support to pressure vessel 14 and also to translate in the vertical direction. Crank 76 is operably connected to center support 74; therefore, to translate center support 74 in the vertical direction, crank 76 is rotated. In the embodiment shown, crank 76 is a hand-operated crank, but it is understood that crank 76 can be a powered crank. First set of support members 78 are situated at the bottom portion of fixture 54 and are configured to provide structural support for all the components of FRTA 48. Second set of support members 80 are situated at the top portion of fixture 54 and are configured to provide structural support to cutting tool actuator 50 and vise 52. First set of support members 78 and second set of support members 80 are comprised of a plurality of horizontal and vertical tubes that are welded together to form a support structure. Flat tabletop surface 82 is positioned proximate the middle of fixture 54. Flat tabletop surface 82 is secured to first set of support members 78 using fasteners or in any other desired manner. Flat tabletop surface 82 can be utilized as a working surface when FRTA 48 is being operated.

During operation, fitting 12 of pressure vessel 14 is first inserted into stationary jaw 68. Moving jaw 66 is translated horizontally toward stationary jaw 68 until moving jaw 66 applies pressure to neck 34 of fitting 12. Stationary jaw 68 and moving jaw 66 firmly grasp neck 34 of fitting 12, resulting in a hanging pressure vessel 14. Center support 74 is raised vertically toward the hanging pressure vessel 14 using crank 76. Center support 74 is raised until center support 74 contacts the underside of pressure vessel 14, providing support to pressure vessel 14 during operation of FRTA 48.

Using lever 60, a non-rotating spindle 62 and attached annular cutting tool 16 are lowered vertically toward device 10 and fitting 12. Spindle 62 and annular cutting tool 16 are lowed vertically until cutting tip 42 of annular cutting tool 16 contacts flange 20 of device 10. Using the controls on cutting tool actuator 50, cutting tool actuator 50 marks the vertical location of spindle 62, indicating the displacement necessary to contact the top of flange 20 of device 10. For example, cutting tool actuator 50 can mark the vertical displacement using a digital caliper or similar apparatus. Next, motor 58 is activated and the rotating spindle 62 and annular cutting tool 16 are lowed toward device 10 and fitting 12 until cutting tool actuator 50 reaches the marked location, indicating cutting tip 42 is contacting the top surface of flange 20 of device 10. The approximate thickness of flange 20 of device 10 is known; therefore, the operator knows how much vertical translation beyond the marked location is necessary to remove only flange 20 of device 10. Spindle 62 and annular cutting tool 16 continue to be lowered until the approximate thickness of flange 20 has been removed.

FRTA 48 allows the operator to precisely remove flange 20 of device 10 and second weld 46 while at the same time minimizing the amount of material removed from flange 28 of fitting 12. Ideally, cutting tip 42 will remove material only from flange 20 and second weld 46 to free device 10 from fitting 12. It is desired to remove minimal amounts of material from flange 28 of fitting 12 because if too much material is removed from fitting 12, fitting 12 may no longer be useable. Once flange 20 of device 10 and second weld 46 have been removed, annular cutting tool 16 is raised vertically away from device 10 and fitting 12. Device 10 can then be unthreaded and removed from fitting 12. After device 10 has been removed, flange 28 of fitting 12 can be cleaned up and made suitable to receive a new device 10 that is to be inserted.

FRTA 48 allows device 10 to be easily replaced while also preventing damage to fitting 12 located on pressure vessel 14. FRTA 48 enables the operator to quickly inspect second weld 46 during the removal process and consistently remove the desired amount of material in a time-efficient manner. FRTA 48 facilitates removal of flange 20 of device 10 and second weld 46 while minimizing contact with flange 28 of fitting 12, ensuring flange 28 of fitting 12 can be reused.

Figure 3:
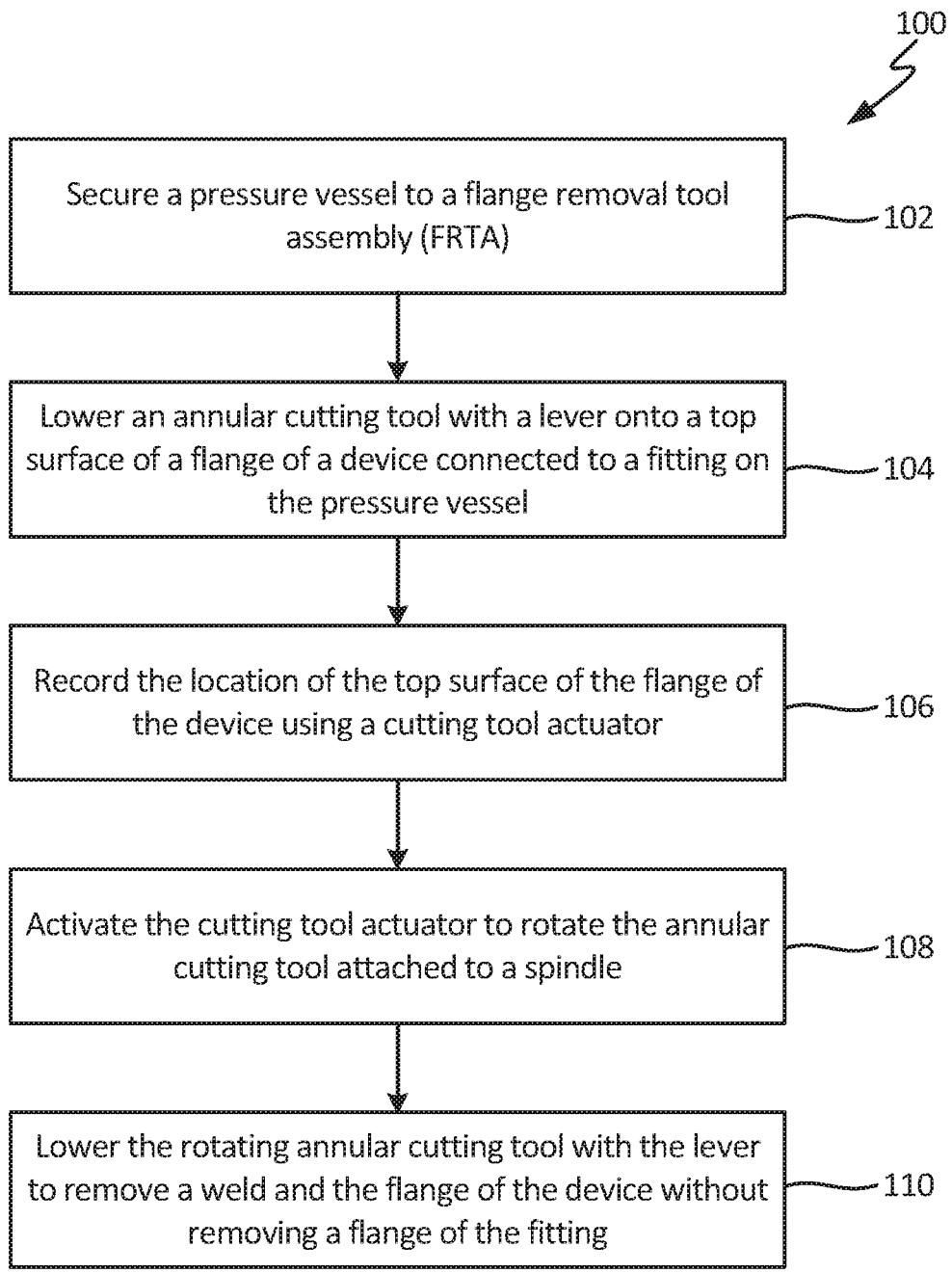
FIG. 3 is a flowchart of a method of removing a flange and weld secured to a fitting.

FIG. 3 is a flowchart of method 100 of removing a flange of a device and a weld from a fitting when the device and the fitting are secured to a pressure vessel, without removing a flange of the fitting. For example, method 100 could be used to remove flange 20 of device 10 and second weld 46 from fitting 12 (best seen in FIGS. 1B-1C) when device 10 and fitting 12 are secured to pressure vessel 14 (best seen in FIGS. 2B-2C), without removing flange 28 of fitting 12 (best seen in FIGS. 1A-1C). Method 100 includes steps 102-110.

In step 102, the pressure vessel is secured to a flange removal tool assembly (FRTA), such as FRTA 48 (shown in FIGS. 2A-2B). In some examples, the pressure vessel is secured to the FRTA by inserting a neck of the fitting, such as neck 34 of fitting 12 (best seen in FIGS. 1A-1C), into a concave portion of a stationary jaw, such as concave tip 72 of stationary jaw 68 (shown in FIGS. 2A-2D). Then a flat tip of a moving jaw, such as flat tip 70 of moving jaw 66 (shown in FIGS. 2A-2D), applies pressure to the opposite side of the neck of the fitting, firmly grasping the neck to hold the pressure vessel stationary during operation of the FRTA. Finally, a center support of a fixture, such as center support 74 of fixture 54 (shown in FIGS. 2A-2B), is raised until the center support contacts a bottom surface of the pressure vessel to provide support during operation of the FRTA.

In step 104, an annular cutting tool, such as annular cutting tool 16 (shown in FIGS. 1C-2C), is lowered with a lever, such as lever 60 (shown in FIGS. 2A-2B), onto a top surface of the flange of the device connected to the fitting on the pressure vessel. In step 106, a cutting tool actuator, such as cutting tool actuator 50 (shown in FIGS. 2A-2B), records the location of the top surface of the flange of the device. For example, the cutting tool actuator can record the vertical displacement of a spindle, such as spindle 62 (shown in FIGS. 2A-2C), using a digital caliper or similar apparatus to record the location of the top surface of the flange of the device. In step 108, the cutting tool actuator is activated to rotate the annular cutting tool attached to the spindle. In step 110, the rotating annular cutting tool is lowered with the lever to remove the weld and the flange of the device without removing the flange of the fitting. For example, the annular cutting tool is lowered to the location recorded in step 106, then lowered a distance associated with the thickness of the flange of the device. By lowering only that associated distance, it ensures that the flange of the device is removed without damaging the flange of the fitting.

Method 100 is an example of using the FRTA to consistently remove a weld and a flange of a device in a time-efficient manner, while at the same time minimizing damage to a flange of a fitting installed on a pressure vessel.

Discussion of Possible Embodiments

The following are non-exclusive descriptions of possible embodiments of the present invention.

A flange removal tool assembly includes a cutting tool actuator, an annular cutting tool, a vise disposed below the cutting tool actuator, and a fixture disposed below the vise. The cutting tool actuator includes a housing, a motor, a lever, and a spindle. The lever is disposed on the housing and interfaces with the spindle that extends from the housing. The vise is configured to grip a neck of a fitting located on a pressure vessel. The fixture includes a center support axially aligned with an axis of rotation of the spindle. The center support is configured to support the pressure vessel. The annular cutting tool is secured to the spindle and is configured to remove a flange of a device installed in the fitting located on the pressure vessel and to preserve a flange of the fitting.

The flange removal tool assembly of the preceding paragraph can optionally include, additionally and/or alternatively, any one or more of the following features, configurations and/or additional components:

The lever is rotatably coupled to the spindle and configured to control the vertical displacement of the spindle along the axis of rotation of the spindle.

The annular cutting tool has a hollow center portion.

The vise is a pneumatic vise.

The vise includes a stationary jaw and a moving jaw, the moving jaw is coupled to a main body of the vise.

The stationary jaw includes a concave tip that is configured to extend around the neck of the fitting. The moving jaw includes a flat tip that is configured to press against an opposite side of the neck from the stationary jaw.

The concave tip of the stationary jaw is configured to axially align the fitting on the pressure vessel with the axis of rotation of the spindle.

The center support is operably connected to a crank. The crank is configured to drive vertical displacement of the center support.

The fixture further includes a first set of support members, a second set of support members, and a flat tabletop surface. The first set of support members is situated at a bottom portion of the fixture, the second set of support members is situated at a top portion of the fixture, and the flat tabletop surface is situated between the first set of support members and the second set of support members.

The flange of the fitting circumferentially extends around the top of the fitting and is configured to mate with the flange on the device.

The fitting includes a first weld that secures the fitting to the pressure vessel and a second weld that secures the device to the fitting.

The first weld circumferentially extends around a base of the fitting. The second weld circumferentially extends around an edge of the flange of the fitting and an edge of the flange of the device.

The annular cutting tool is configured to simultaneously remove the flange of the device and the second weld.

A method of removing a weld and a flange of a device, with the device secured to a fitting on a pressure vessel, includes securing a pressure vessel to a flange removal tool assembly. The flange removal tool assembly includes a cutting tool actuator, an annular cutting tool, a vise, and a fixture. The cutting tool actuator includes a housing, a motor, a lever, and a spindle. The annular cutting tool is attached to the spindle. The vise and the fixture are located below the cutting tool actuator. The fixture includes a center support to support a pressure vessel. Lowering the non-rotating annular cutting tool with the lever onto a top surface of the flange of the device connected to the fitting on the pressure vessel. Recording a relative location of the top surface of the flange of the device using the cutting tool actuator controls. Activating the cutting tool actuator to rotate the annular cutting tool attached to the spindle. Lowering, with the annular cutting tool contacting the top surface of the flange of the device, the annular cutting tool with the lever an amount that corresponds to a thickness of the flange of the device, thereby removing a weld and the flange of the device without removing a flange of the fitting, and allowing the device to be removed from the fitting.

The method of the preceding paragraph can optionally include, additionally and/or alternatively, any one or more of the following features, configurations and/or additional components:

The cutting tool has a hollow center portion to receive the device.

The vise includes a stationary jaw and a moving jaw coupled to a main body of the vise and is configured to align and secure the pressure vessel in the flange removal tool assembly.

The stationary jaw includes a concave tip that is configured to extend around a neck of the fitting to axially align the fitting with the axis of rotation of the spindle. The moving jaw includes a flat tip that is configured to press against the opposite side of the neck of the fitting.

The center support is operably connected to a crank. The crank is configured to adjust a vertical location of the pressure vessel.

The vise is pneumatically actuated.

The flange of the fitting circumferentially extends around the top of the fitting and is configured to receive the weld around an edge of the flange to secure the device to the fitting.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flange removal tool assembly comprising:
a cutting tool actuator that includes a housing, a motor, a lever, and a spindle, wherein the lever is disposed on the housing and interfaces with the spindle that extends from the housing;
an annular cutting tool secured to the spindle;
a vise disposed below the cutting tool actuator, the vise being configured to grip a neck of a fitting located on a pressure vessel; and
a fixture disposed below the vise, wherein the fixture includes a center support axially aligned with an axis of rotation of the spindle, the center support configured to support the pressure vessel;
wherein the annular cutting tool is configured to remove a flange of a device installed in the fitting located on the pressure vessel and preserve a flange of the fitting; and
wherein the flange of the fitting circumferentially extends around a top of the fitting, the flange of the fitting being configured to mate with the flange on the device, and the fitting includes a first weld that secures the fitting to the pressure vessel and a second weld that secures the device to the fitting.

2. The flange removal tool assembly of claim 1, wherein the lever is rotatably coupled to the spindle, the lever configured to control the vertical displacement of the spindle along the axis of rotation of the spindle.

3. The flange removal tool assembly of claim 1, wherein the annular cutting tool has a hollow center portion.

4. The flange removal tool assembly of claim 1, wherein the vise is a pneumatic vise.

5. The flange removal tool assembly of claim 1, wherein the vise includes a stationary jaw and a moving jaw, the moving jaw being coupled to a main body of the vise.

6. The flange removal tool assembly of claim 5, wherein the stationary jaw includes a concave tip that is configured to extend around the neck of the fitting, and wherein the moving jaw includes a flat tip that is configured to press against an opposite side of the neck from the stationary jaw.

7. The flange removal tool assembly of claim 6, wherein the concave tip of the stationary jaw is configured to axially align the fitting on the pressure vessel with the axis of rotation of the spindle.

8. The flange removal tool assembly of claim 1, wherein the center support is operably connected to a crank, the crank being configured to drive vertical displacement of the center support.

9. The flange removal tool assembly of claim 1, wherein the fixture further includes a first set of support members, a second set of support members, and a flat tabletop surface, the first set of support members being situated at a bottom portion of the fixture, the second set of support members being situated at a top portion of the fixture, and the flat tabletop surface being situated between the first set of support members and the second set of support members.

10. The flange removal tool assembly of claim 1, wherein the first weld circumferentially extends around a base of the fitting, and wherein the second weld circumferentially extends around an edge of the flange of the fitting and an edge of the flange of the device.

11. The flange removal tool assembly of claim 10, wherein the annular cutting tool is configured to simultaneously remove the flange of the device and the second weld.

12. A method of removing a weld and a flange of a device, with the device secured to a fitting on a pressure vessel, the method comprising:
securing a pressure vessel to a flange removal tool assembly, the flange removal tool assembly comprising:
a cutting tool actuator that includes a housing, a motor, a lever, and a spindle, an annular cutting tool attached to the spindle, a vise, and a fixture that includes a center support;
lowering the non-rotating annular cutting tool with the lever onto a top surface of the flange of the device connected to the fitting on the pressure vessel;
recording a relative location of the top surface of the flange of the device using the cutting tool actuator controls;
activating the cutting tool actuator to rotate the annular cutting tool attached to the spindle; and
lowering, with the annular cutting tool contacting the top surface of the flange of the device, the annular cutting tool with the lever an amount that corresponds to a thickness of the flange of the device, thereby removing a weld and the flange of the device without removing a flange of the fitting, and allowing the device to be removed from the fitting.

13. The method of claim 12, wherein the cutting tool has a hollow center portion to receive the device.

14. The method of claim 12, wherein the vise includes a stationary jaw and a moving jaw coupled to a main body of the vise, the vise being configured to align and secure the pressure vessel in the flange removal tool assembly.

15. The vise of claim 14, wherein the stationary jaw includes a concave tip that is configured to extend around a neck of the fitting to axially align the fitting with the axis of rotation of the spindle, and wherein the moving jaw includes a flat tip that is configured to press against the opposite side of the neck of the fitting.

16. The method of claim 12, wherein the center support is operably connected to a crank, the crank being configured to adjust a vertical location of the pressure vessel.

17. The method of claim 12, wherein the vise is pneumatically actuated.

18. The method of claim 12, wherein the flange of the fitting circumferentially extends around the top of the fitting, the flange being configured to receive the weld around an edge of the flange to secure the device to the fitting.

19. A flange removal tool assembly comprising:
a cutting tool actuator that includes a housing, a motor, a lever, and a spindle, wherein the lever is disposed on the housing and interfaces with the spindle that extends from the housing;
an annular cutting tool secured to the spindle;
a vise disposed below the cutting tool actuator, the vise includes a stationary jaw and a moving jaw with the moving jaw being coupled to a main body of the vise, the vise being configured to grip a neck of a fitting located on a pressure vessel; and
a fixture disposed below the vise, wherein the fixture includes a center support axially aligned with an axis of rotation of the spindle, the center support configured to support the pressure vessel;
wherein the annular cutting tool is configured to remove a flange of a device installed in the fitting located on the pressure vessel and preserve a flange of the fitting; and
wherein the stationary jaw includes a concave tip that is configured to extend around the neck of the fitting and the moving jaw includes a flat tip that is configured to press against an opposite side of the neck from the stationary jaw.

20. The flange removal tool assembly of claim 19, wherein the concave tip of the stationary jaw is configured to axially align the fitting on the pressure vessel with the axis of rotation of the spindle.

* * * * *